(12) United States Patent
Kanbara et al.

(10) Patent No.: US 8,231,232 B2
(45) Date of Patent: Jul. 31, 2012

(54) ILLUMINATING DEVICE, IMAGE DISPLAY DEVICE, AND LAMP UNIT

(75) Inventors: Toshimasa Kanbara, Kishiwada (JP); Taichi Yoshimura, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 525 days.

(21) Appl. No.: 12/612,672

(22) Filed: Nov. 4, 2009

(65) Prior Publication Data

US 2010/0110396 A1   May 6, 2010

(30) Foreign Application Priority Data

Nov. 5, 2008   (JP) .................................. 2008-284695

(51) Int. Cl.
*G03B 21/20*   (2006.01)
*F21V 19/00*   (2006.01)

(52) U.S. Cl. ........................................ 353/119; 353/101
(58) Field of Classification Search .................. 353/101, 353/119

See application file for complete search history.

(56) References Cited

FOREIGN PATENT DOCUMENTS

JP          2008-16334 A     1/2008

*Primary Examiner* — Tony Ko
(74) *Attorney, Agent, or Firm* — Novak Druce + Quigg LLP

(57) ABSTRACT

A circuit board is attached in a displaceable manner to a lamp holder. When the lamp holder is attached to a holder housing, ends of pins extending from the holder housing are inserted into holes of the circuit board. At the time, the circuit board is guided and corrected for a positional shift by inclines at ends of the pins. Accordingly, a connector on an under surface of the circuit board is opposed to a connector on a circuit board in the holder housing side, whereby the two connectors can be properly connected.

10 Claims, 9 Drawing Sheets

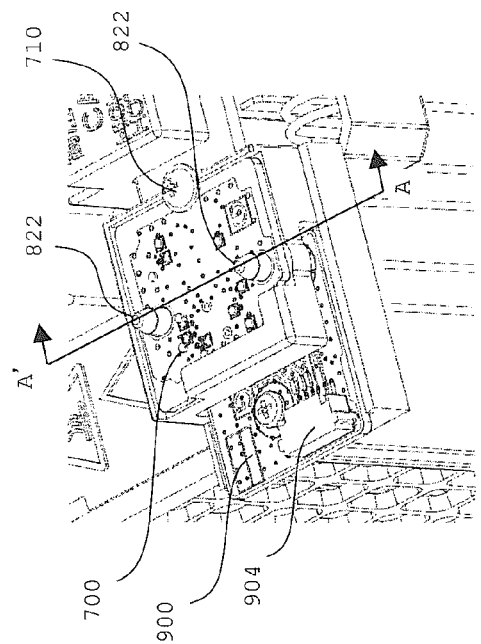
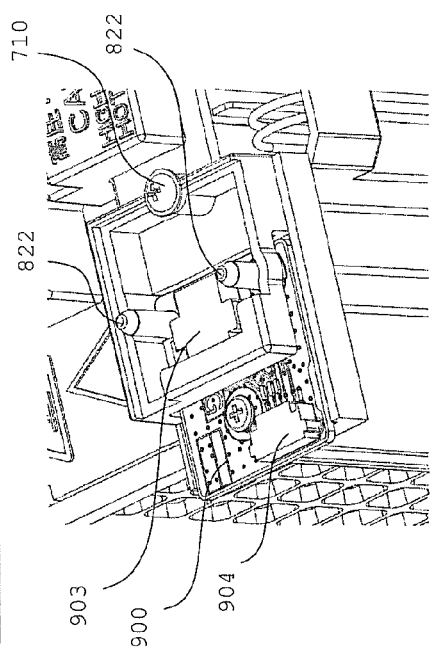
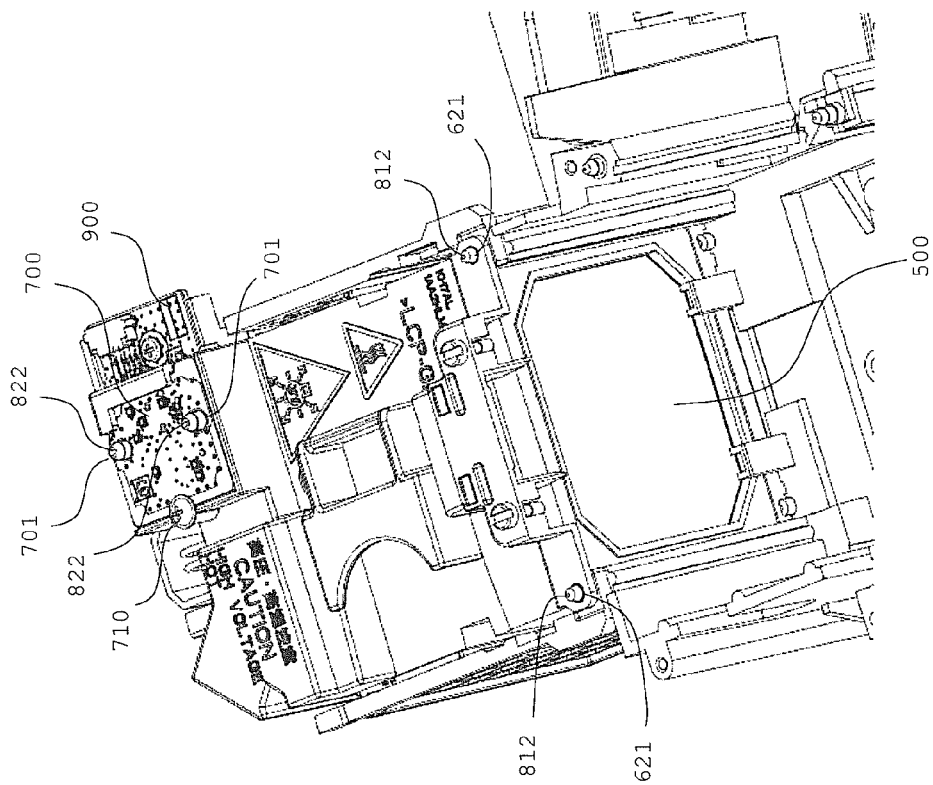

ILLUMINATING DEVICE, IMAGE DISPLAY DEVICE, AND LAMP UNIT

This application claims priority under 35 U.S.C. Section 119 of Japanese Patent Application No. 2008-284695 filed Nov. 5, 2008, entitled "ILLUMINATING DEVICE, IMAGE DISPLAY DEVICE, AND LAMP UNIT". The disclosure of the above application is incorporated herein by reference.

BACKGROUND OF THE INVENTION

1. Field of the Invention

The present invention relates town illuminating device, an image display device equipped with the illuminating device, and a lamp unit attached to the illuminating device, and in particular is suitable for the case where the lamp unit is replaceable.

2. Disclosure of the Related Art

Currently, there are commercialized and widespread projection display devices that project a magnified image onto a screen (hereinafter referred to as "projectors"). In such projectors, a lamp is generally used as a light source and light from the lamp is modulated by an imager and is projected onto a screen.

In this arrangement, when the lamp has run out in the middle of projecting operation, image display is interrupted. To handle such a situation, the lamp is generally made replaceable in the projector.

If lamp replacement can be performed easily, it can be conceived that lamps are replaced as appropriate depending on the scenes of using the projector. For example, when making a presentation with the projector, an old lamp is used for practice and a new high-intensity lamp is used for the real presentation.

For frequent lamp replacement, each lamp needs to be managed for lifetime, compatibility with projectors, and others. As a method for the management, the lamp may be provided with a circuit board storing predetermined information. This method requires a communication path to be established between a circuit board on the projector side and the circuit board on the lamp side when the lamp is attached. Such communication path can be established by connecting two connectors on the circuit boards.

To improve workability at lamp replacement, it is desired that the connectors on the two circuit boards are connected to each other when the lamp is attached. For example, the two connectors may be arranged so as to become opposed to each other when a lamp unit is attached. This allows the two connectors to be connected simultaneously with incorporating the lamp unit into a desired position of the projector main unit.

However, a circuit board of the lamp unit is positioned distant from the lamp so as to be kept away from a heat source as much as possible. In general, the lamp is placed in the projector precisely at a desired position so that a light axis thereof can be properly positioned with respect to an optical engine. However, if the circuit board is positioned distant from the lamp as stated above, the circuit board of the lamp unit may be out of position even if the lamp is precisely positioned, whereby the connectors on the two circuit boards cannot be properly connected.

SUMMARY OF THE INVENTION

An object of the present invention is to allow easy and smooth connection between a connector of a lamp unit and a connector of a main unit when the lamp unit is incorporated into a desired position.

A first aspect of the present invention relates to an illuminating device. The illuminating device in the first aspect includes a lamp holder that holds a lamp; a first circuit board that is attached to the lamp holder and has a first connector; a holder housing to which the lamp holder is attached; and a second circuit board that is arranged on the holder housing side and has a second connector connected to the first connector. Here, the lamp holder is attached to the holder housing by being moved in a direction of connection between the first connector and the second connector. Either one of the first circuit board and the second circuit board is displaceable in a direction perpendicular to the direction of connection between the first connector and the second connector.

According to the illuminating device in the first aspect, even if the first connector and the second connector are not opposed to each other when the lamp holder is attached to the holder housing, the first connector and the second connector can be positively opposed to each other by changing the relative positions of the first circuit board and the second circuit board. Accordingly, the first connector and the second connector can be easily connected when the lamp holder is attached to the holder housing.

The illuminating device in the first aspect may be configured so as to further have a position adjustment mechanism that adjusts the relative positions of the first connector and the second connector so that the first connector and the second connector can be opposed and connected to each other when the lamp holder is attached to the holder housing.

Here, the position adjustment mechanism may be configured so as to include a hole in a displaceable circuit board of the first circuit board and the second circuit board, and a projection projecting from the other circuit board and engaging with the hole.

Providing the position adjustment mechanism allows the first connector to be properly positioned with respect to the second connector, whereby the connectors can be more easily connected.

If the position adjustment mechanism is formed by a hole and a projection, the projection desirably has a tapered end. Accordingly, when the lamp holder is attached to the holder housing, the end of the projection can be easily inserted into the hole. In addition, even if there is a relative positional shift between the first circuit board and the second circuit board, the circuit board having the hole is guided and displaced by the projection, whereby the relative positions of the two circuit boards are properly adjusted. Consequently, the first connector and the second connector can be connected only by attaching the lamp holder to the holder housing.

A second aspect of the present invention relates to an image display device. The image display device in the second aspect includes the illuminating device in the first aspect, an imager that modulates illumination light generated by the illuminating device in accordance with an image signal, and a light-guiding optical system that guides the illumination light from the illuminating device to the imager. According to the image display device in the second aspect, it is possible to provide the advantages of the illuminating device in the first aspect.

A third aspect of the present invention relates to a lamp unit. The lamp unit in the third aspect includes a lamp, a lamp holder that holds the lamp, and a circuit board that is attached to the lamp holder and has a connector. The circuit board is displaceable in a direction perpendicular to a direction of connection of the connectors.

According to the lamp unit in the third aspect, even if the connector of the lamp holder and a connector of a main unit are not opposed to each other when the lamp holder is attached to a holder housing, the connector of the lamp holder and the connector of the main unit can be positively opposed to each other by changing the position of the circuit board. Accordingly, the connector of the lamp holder and the connector of the main unit can be easily connected when the lamp holder is attached to the holder housing.

In the lamp unit of this arrangement, the circuit board may have a hole that engages with a projection projecting from the holder housing side when the lamp holder is attached to the holder housing of the main unit. This allows the connector of the lamp holder to be properly positioned with respect to the connector of the main unit, whereby the connectors can be more easily connected.

BRIEF DESCRIPTION OF THE DRAWINGS

FIGS. 8A, 8B, and 8C are perspective views of the attached lamp unit in the embodiment.

However, the drawings are only for the purpose of illustration and do not limit the scope of the present invention.

DESCRIPTION OF PREFERRED EMBODIMENTS

Hereafter, a configuration of a projector in an embodiment of the present invention will be described with reference to the drawings. The projector in this embodiment has two lamp units as light sources of the illuminating device.

Figure 1:
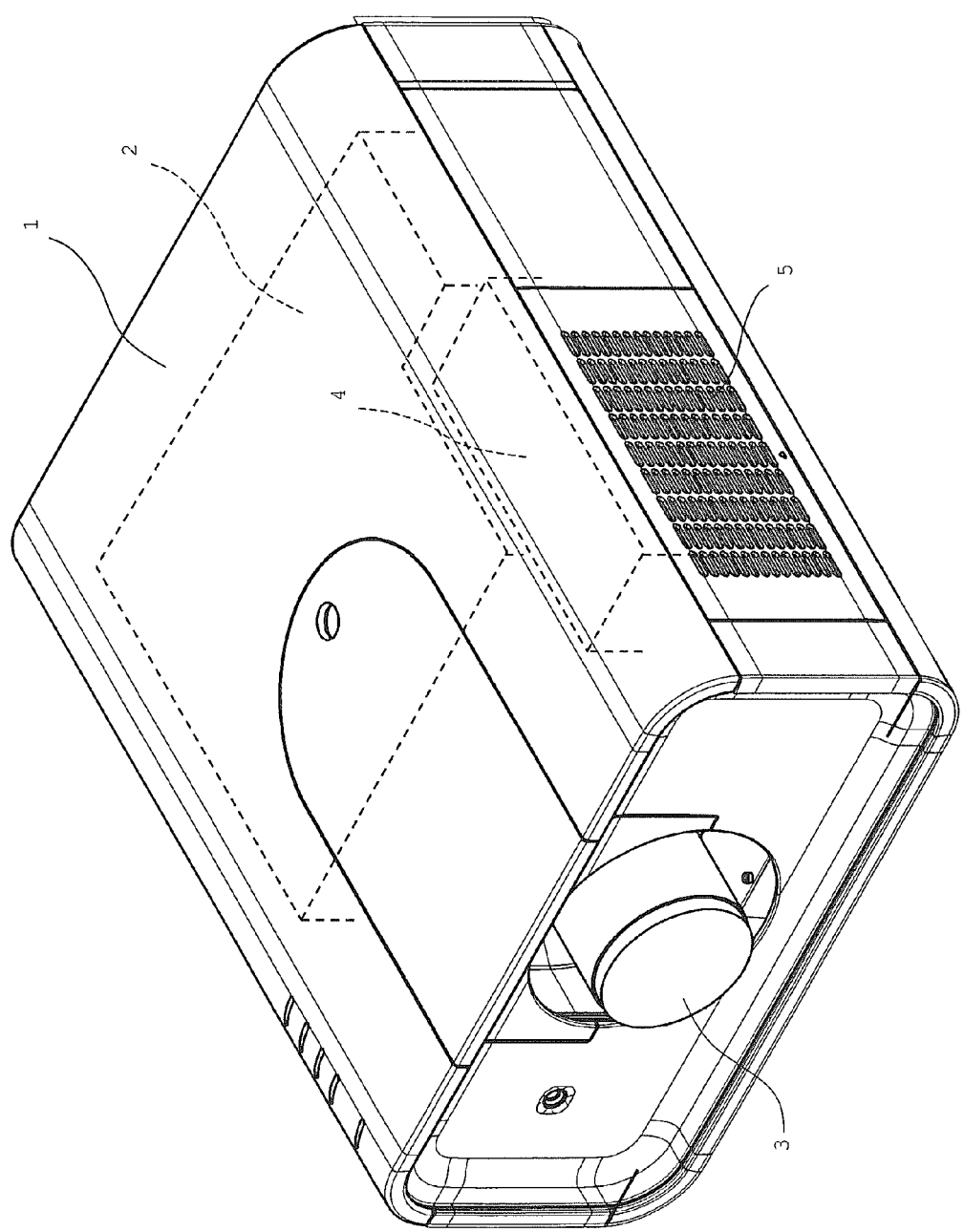
FIG. 1 is a perspective overview of a projector in an embodiment of the present invention.

FIG. 1 is a perspective overview of the configuration of the projector. The projector includes a cabinet 1. The cabinet 1 is shaped like an approximately rectangular parallelepiped that is vertically thin and horizontally long, and has an intake port 5 on a side surface to take external air into the cabinet 1. The cabinet 1 also has on a rear side an openable and closable lamp cover (not shown). The user can open the lamp cover as necessary to replace the lamp units.

The cabinet 1 includes an optical engine 2, a projection lens 3, and a cooler 4 therein. The optical engine 2 generates light modulated by an image signal (image light). The optical engine 2 has the projection lens 3 attached. A front part of the projection lens 3 is exposed from a front surface of the cabinet 1. The image light generated by the optical engine 2 is projected by the projection lens 3 onto a surface of a screen in front of the projector. The cooler 4 takes in external air from the intake port 5, and supplies the external air as cooling winds to the optical engine 2.

Figure 2:
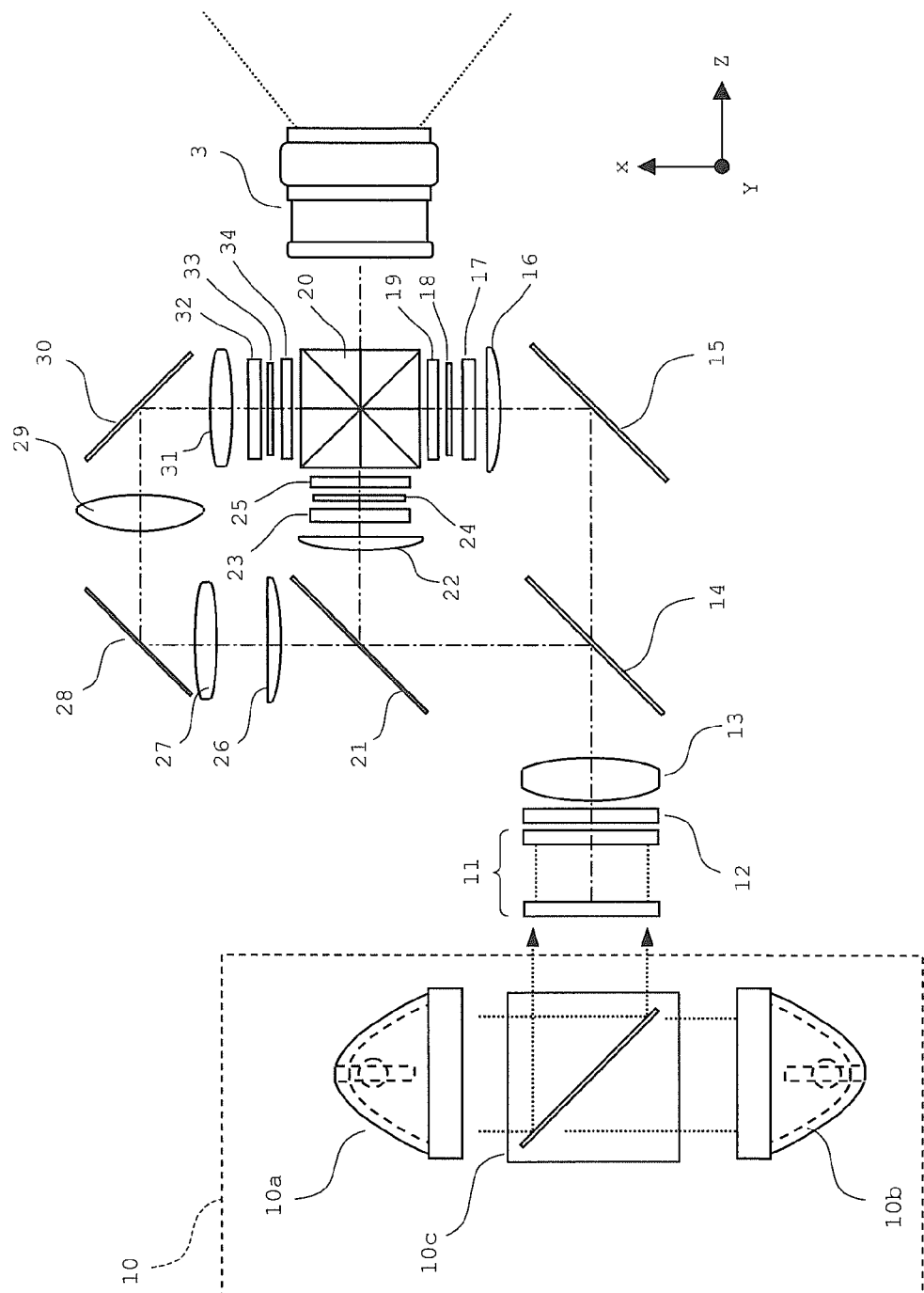
FIG. 2 is a plane view showing a configuration of an optical engine in the embodiment.

FIG. 2 is a diagram showing a configuration of the optical engine. In FIG. 2, reference numeral 10 denotes an illuminating device having two lamp units 10a and 10b and a mirror unit 10c. The lamp units 10a and 10b include lamps formed by extra high-pressure mercury lamps, metal halide lamps, xenon lamps, or the like. Light from the lamp units 10a and 10b is launched as approximately parallel light by the action of a reflector. A configuration of the lamp units 10a and 10b will be described later in detail.

The mirror unit 10c has a mirror rotatable in parallel to an X-Z plane shown in FIG. 2. The mirror is rotated to guide light from the lamp unit 10a to a fly-eye integrator 11 when the lamp unit 10a is activated, and to guide light from the lamp unit 10b to the fly-eye integrator 11 when the lamp unit 10b is activated. A configuration of the mirror unit 10c will be described later with reference to FIGS. 3A, 3B, 4, 5A, and 5B.

Light from the illuminating device 10 is entered into a polarized beam splitter (PBS) array 12 and a condenser lens 13 via the fly-eye integrator 11. The fly-eye integrator 11 includes first and second fly-eye lenses formed by fly-eye lens groups. The fly-eye integrator 11 exerts an optical effect on the incident light from the illuminating device 10 so as to bring a uniform distribution of amounts of incident light on liquid crystal panels 18, 24, and 33.

The PBS array 12 includes an array of a plurality of PBS's and half-wavelength plates, and unifies polarization directions of incident light from the fly-eye integrator 11. The condenser lens 13 exerts an effect of gathering the incident light from the PBS array 12. The light having passed through the condenser lens 13 is entered into a dichroic mirror 14.

Out of the incident light from the condenser lens 13, the dichroic mirror 14 lets only blue-waveband light (hereinafter referred to as "B light") pass through and reflects red-waveband light (hereinafter referred to as "R light") and green-waveband light (hereinafter referred to as "G light"). After having passed through the dichroic mirror 14, the B light is reflected by a mirror 15 and then is entered into a condenser lens 16.

The condenser lens 16 exerts an optical effect on the B light so that the B light is entered as approximately parallel light into a liquid crystal panel 18. After having passed through the condenser lens 16, the B light is entered into the liquid crystal panel 18 via an incident-side polarizer 17. The crystal panel 18 is driven in accordance with an image signal for blue color to modulate the B light depending on the driven state. After having modulated by the liquid crystal panel 18, the B light is entered into a dichroic prism 20 via an output-side polarizer 19.

Out of the light reflected by the dichroic mirror 14, the G light is reflected by a dichroic mirror 21 and then is entered into a condenser lens 22. The condenser lens 22 exerts an optical effect on the G light so that the G light is entered as approximately parallel light into a liquid crystal panel 24. After having passed through the condenser lens 22, the G light is entered into the liquid crystal panel 24 via an incident-side polarizer 23. The liquid crystal panel 24 is driven in accordance with an image signal for green color to modulate the G light depending on the driven state. After having modulated by the liquid crystal panel 24, the G light is entered into the dichroic prism 20 via an output-side polarizer 25.

After having passed through the dichroic mirror 21, the R light is entered into a condenser lens 26. The condenser lens 26 exerts an optical effect on the R light so that the R light is entered as approximately parallel light into a liquid crystal panel 33. After having passed through the condenser lens 26, the R light travels along a light path that is formed by relay lenses 27, 29, and 31 for adjustment of light path length and two mirrors 28 and 30, and then the R light is entered into a liquid crystal panel 33 via an incident-side polarizer 32. The liquid crystal panel 33 is driven in accordance with an image signal for red color to modulate the R light depending on the driven state. After having modulated by the liquid crystal panel 33, the R light is entered into the dichroic prism 20 via an output-side polarizer 34.

The dichroic prism 20 combines the B, G, and R light respectively modulated by the liquid crystal panels 18, 24, and 33, and enters the same into the projection lens 3. The projection lens 3 includes a lens group that produces an image of projected light on a projection plane, and an actuator that displaces part of the lens group in a direction of a light axis to thereby adjust zoom and focus states of a projected image. The light combined by the dichroic prism 20 is magnified and projected onto a screen by the projection lens 3.

Next, a configuration of the mirror unit 10c will be described with reference to FIGS. 3A and 3B.

Figure 3A:
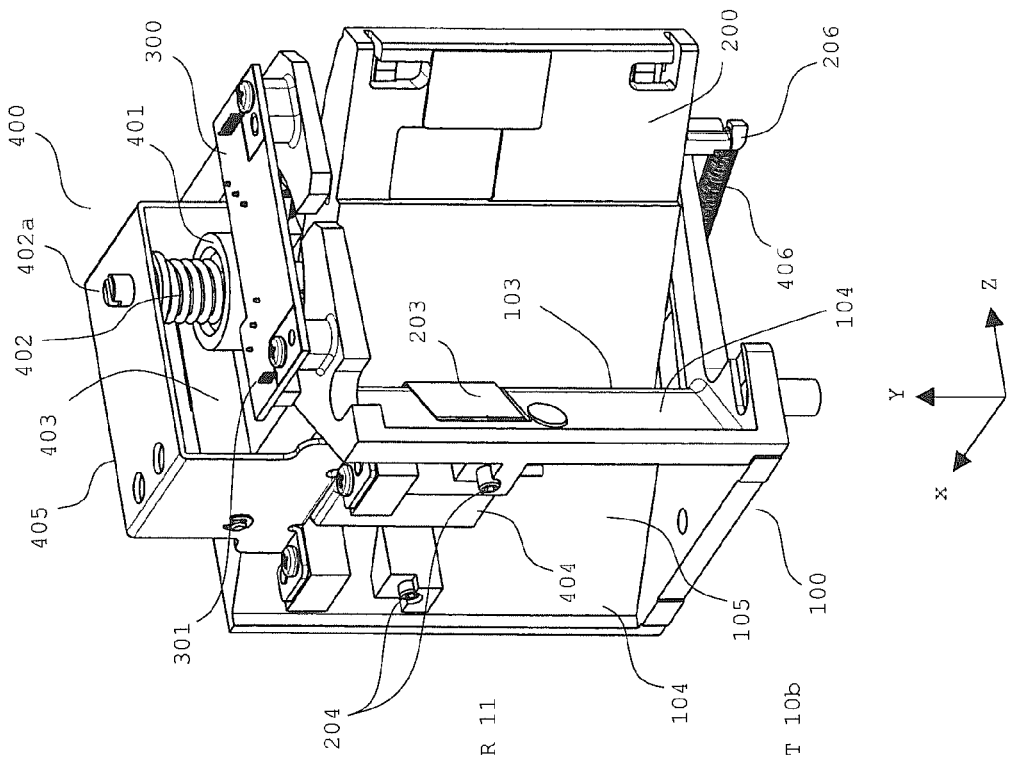
FIGS. 3A and 3B are perspective views of a configuration of a mirror unit in the embodiment.
Figure 3B:
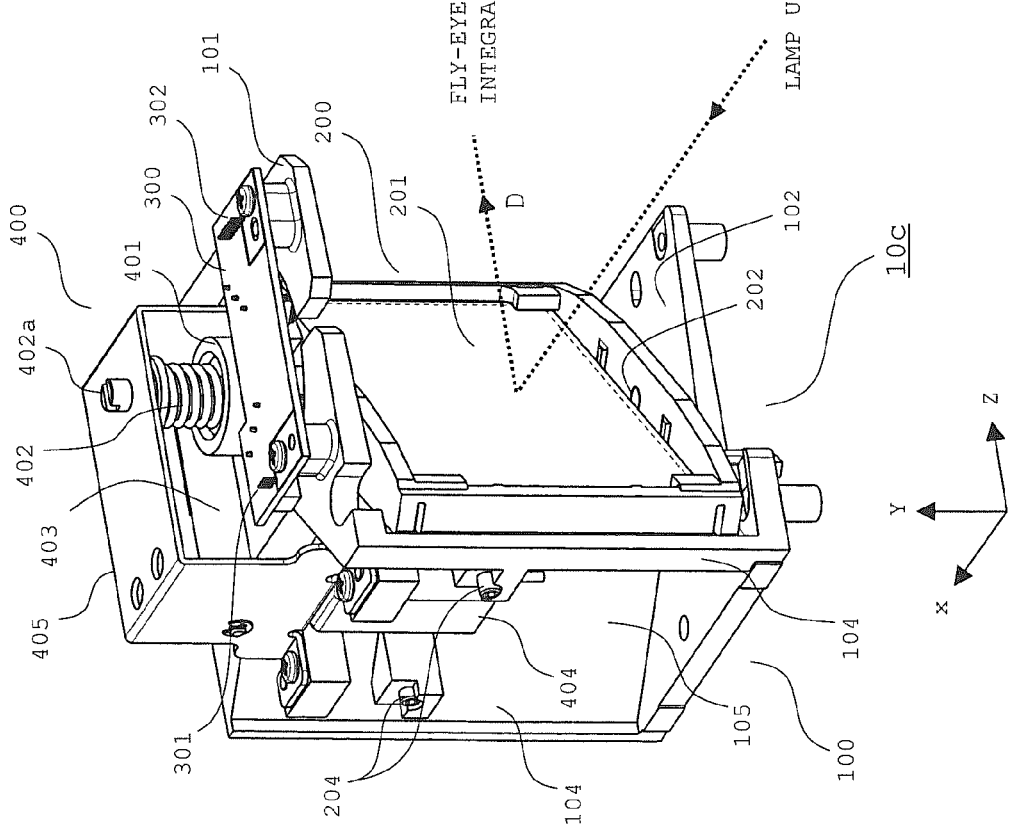

FIGS. 3A and 3B are perspective views of the configuration of the mirror unit 10c.

In FIGS. 3A and 3B, a base 100 includes an upper plate 101, a lower plate 102, a rear plate 103, and two walls 104. The upper plate 101, lower plate 102, rear plate 103, and two walls 104 are integrally formed by aluminum die casting. In addition, a hollow 105 is provided between the two walls 104 so as to continue to the upper plate 101. The lower plate 102 and the upper plate 101 are parallel to each other. A mirror holder 200 is rotatably provided between the lower plate 102 and the upper plate 101.

The two walls 104 and the rear plate 103 have on inner sides a concave contoured to be slightly larger than an adjustment plate 203. The adjustment plate 203 is fitted and screwed in the concave. The adjustment plate 203 is screwed at a central part on the rear plate 103 and is pressed at parts corresponding to the two walls 104 against the two walls 104 so as to be capable of being elastically displaced. The adjustment plate 203 is formed of a flexible, thin metal film. In addition, the two walls 104 have adjustment screws 204 screwed on outer surfaces, and ends of the adjustment screws 204 are in contact with the adjustment plate 203.

The two walls 104 are formed such that inner surfaces thereof are inclined at an angle of approximately 45 degrees with respect to the respective travel directions of light from the lamp units 10a and 10b when the mirror unit 10c is disposed in the optical engine shown in FIG. 2.

The mirror holder 200 is provided with a mirror 201. The mirror holder 200 also has projecting shafts 202 in coaxial positions on upper and lower surfaces. The shaft 202 on the lower surface of the mirror holder 200 is fitted into a shaft hole in the lower plate 102. The shaft 202 on the upper surface of the mirror holder 200 is attached to a torque limiter 402 via a shaft bearing.

The upper plate 101 has on the upper surface a substrate 300 attached via bosses. The substrate 300 has two detection switches 301 and 302 on a lower surface. The detection switches 301 and 302 are pressed and turned on by projections (not shown) on the upper surface of the mirror holder 200 when the mirror holder 200 is brought into a rotation termination position.

A drive part 400 includes a gear 401 with a torque limiter 402, a gear 403, a motor 404, a gear (not shown) attached to a drive shaft of the motor 404, a cover 405, and a coil spring 406 disposed on the lower plate 102 side. The torque limiter 402 causes the gear 401 to run idle when a specific or higher level of torque is applied. The gear 403 is rotatably attached to the cover 405. The cover 405 has a shaft hole that engages with a shaft 402a of the torque limiter 402. The cover 405 is screwed into the bosses formed on outer surfaces of the walls 104. The motor 404 is attached in the hollow 105 between the two walls 104.

A driving force from the motor 404 is transferred to the torque limiter 402 via the gear attached to the drive shaft of the motor 404 and the gears 403 and 401. The driving force is further transferred to the shaft 202 on the upper surface of the mirror holder 200, which is attached to the torque limiter 402. This arrangement allows the mirror 201 to rotate with the mirror holder 200.

The lower plate 102 has a coil spring 406 on a bottom surface. The coil spring 406 is mounted on the mirror unit 10c such that both ends thereof are locked between a hook formed on the lower surface of the mirror holder 200 and a hook formed on the bottom surface of the lower plate 102. The coil spring 406 biases the mirror holder 200 in a direction that presses the mirror holder 200 against the front wall 104 in a state shown in FIG. 3A, and biases the mirror holder 200 in a direction that presses the mirror holder 200 against the back wall 104 in a state shown in FIG. 3B.

The rotation termination position of the mirror holder 200 can be adjusted by an amount of lifting of the adjustment plate 203 using the adjustment screws 204. When the mirror unit 10c is incorporated into the optical engine shown in FIG. 2, the adjustment screws 204 are used to adjust the amount of lifting of the adjustment plate 203 so that light from both the lamp units 10a and 10b travels properly toward the fly-eye integrator 11.

As shown in FIG. 3A, light from the lamp unit 10b is reflected and guided by the mirror 201 to the fly-eye integrator 11. To switch to the other lamp unit, the motor 404 is driven to rotate the mirror unit 200 counterclockwise. This rotation is continued until a specific period of time has elapsed after the detection switch 302 is turned on.

In the meantime, the mirror unit 200 is pressed against the adjustment plate 203 to position the mirror 201 at a position shown in FIG. 3B. During the pressing, the gear 401 runs idle by the action of the torque limiter 402. Accordingly, the mirror unit 200 is situated in a position shown in FIG. 3B, and light from the lamp unit 10a is reflected and guided by the mirror 201 to the fly-eye integrator 11. If the mirror unit 10c is switched from the state of FIG. 3B to the state of FIG. 3A, the same operation as described above is performed except that the direction of driving the motor 404 is reversed.

Next, a configuration of a lamp unit and a method of mounting the lamp unit will be described below with reference to FIGS. 4 to 8A, 8B, and 8C. The following description is given taking one lamp unit as an example, but the described configuration and mounting method are applicable to both of the two lamp units 10a and 10b shown in FIG. 2.

Figure 4:
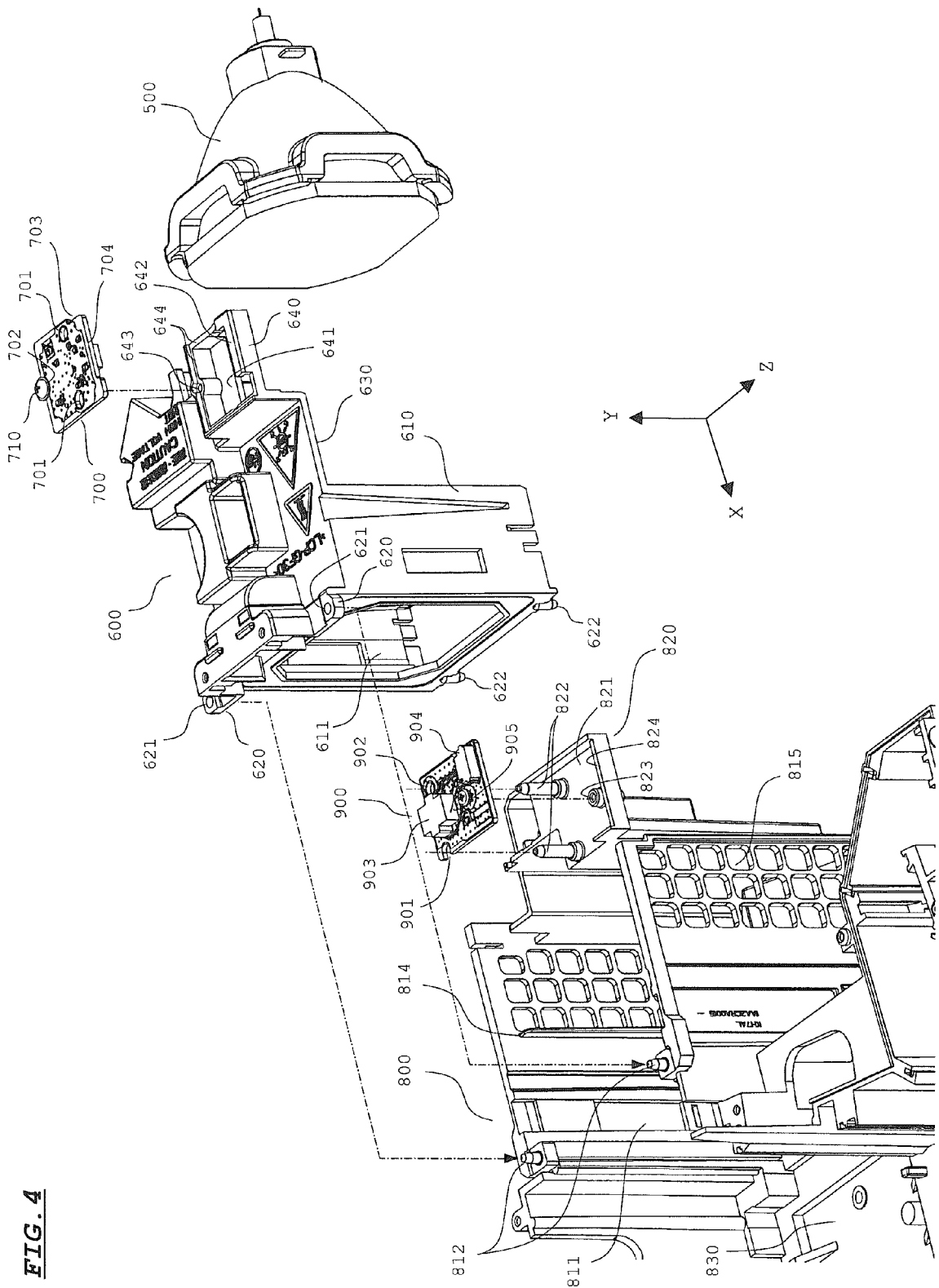
FIG. 4 is an exploded perspective view of a configuration of a lamp unit in the embodiment.

FIG. 4 is a diagram showing the configuration of a lamp unit and a mounting portion thereof. The lamp unit includes a lamp 500, a lamp holder 600 holding the lamp 500, and a circuit board 700. Meanwhile, the main unit chassis side has a holder housing 800 housing the lamp holder 600 and a circuit board 900. The mirror unit 200 is attached to a mirror unit attachment part 830 shown in FIG. 4.

The lamp holder 600 includes a box 610 to which the lamp 500 is attached. The box 610 has on a front surface an opening 611 for guiding light from the lamp 500 forward. The box 610 also has forward projecting flanges 620 with holes 621 on an upper front surface. The box 610 further has two downward projecting pins 622 on the upper front surface. In addition, the box 610 has on an upper rear surface a backward projecting L-shaped flange 630 with a board holding part 640 extending therefrom.

Figure 5A:
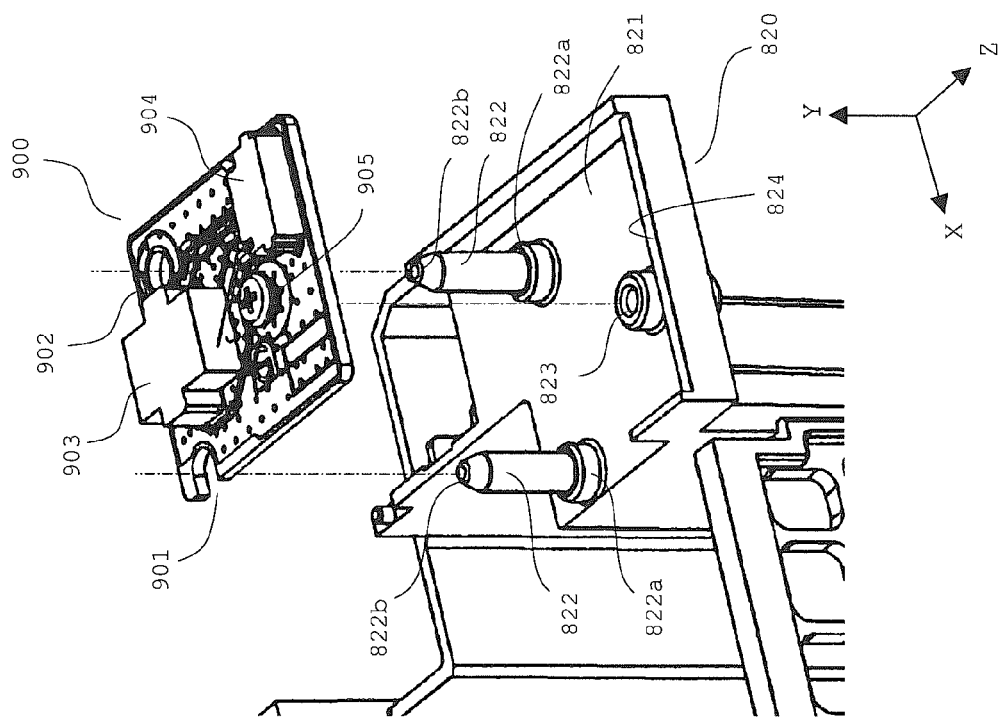
FIGS. 5A and 5B are enlarged perspective views of a part of the lamp unit in the embodiment.

FIG. 5A is an enlarged view of the board holding part 640. The board holding part 640 has a vertically penetrating opening 641. The board holding part 640 also has on an upper surface an L-shaped locking part 642 locking the circuit board 700 in X- and Y-axis directions. The board holding part 640 also has a screw hole 643 into which a screw 710 is screwed. The board holding part 640 further has on the upper surface a placement part 644 on which an outer edge of the circuit board 700 is placed.

Figure 6B:
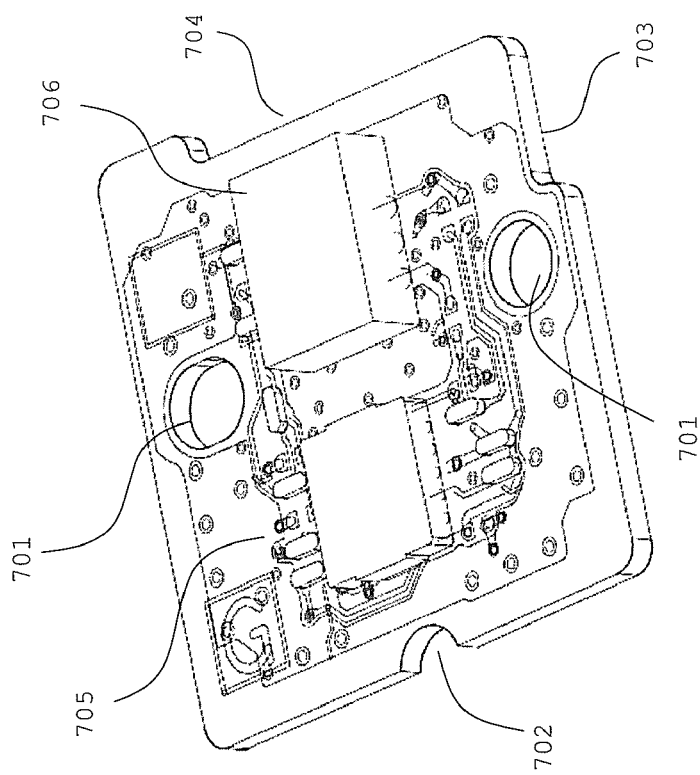
FIGS. 6A and 6B are perspective views of a configuration of a circuit board of the lamp unit in the embodiment.
Figure 6A:
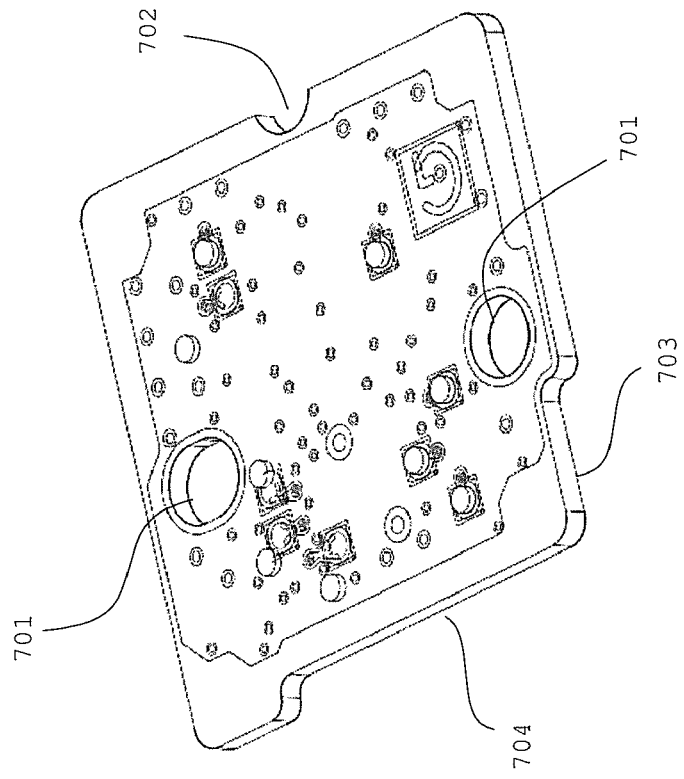

FIGS. 6A and 6B are diagrams showing a configuration of the circuit board 700. FIG. 6A is a top view and FIG. 6B is a bottom view. The circuit board 700 includes two holes 701 and a notch 702 in a position corresponding to a side screw 710. The circuit board 700 also has notches 703 and 704 in positions corresponding to the locking part 642 of the board holding part 640. The circuit board 700 has on the bottom surface a circuit part 705 including an IC and a connector 706 electrically connected to the circuit part 705.

Referring to FIG. 5A, the circuit board 700 is contoured so as to be displaceable only by a predetermined stroke in the X- and Z-axis directions when the outer edge thereof is placed on the placement part 644 while the notches 703 and 704 are fitted into the locking part 642. In addition, the placement part 644 is sufficiently widened so that the circuit board 700 does not fall into the opening 641 even if the circuit board 700 is displaced as described above.

Figure 7:
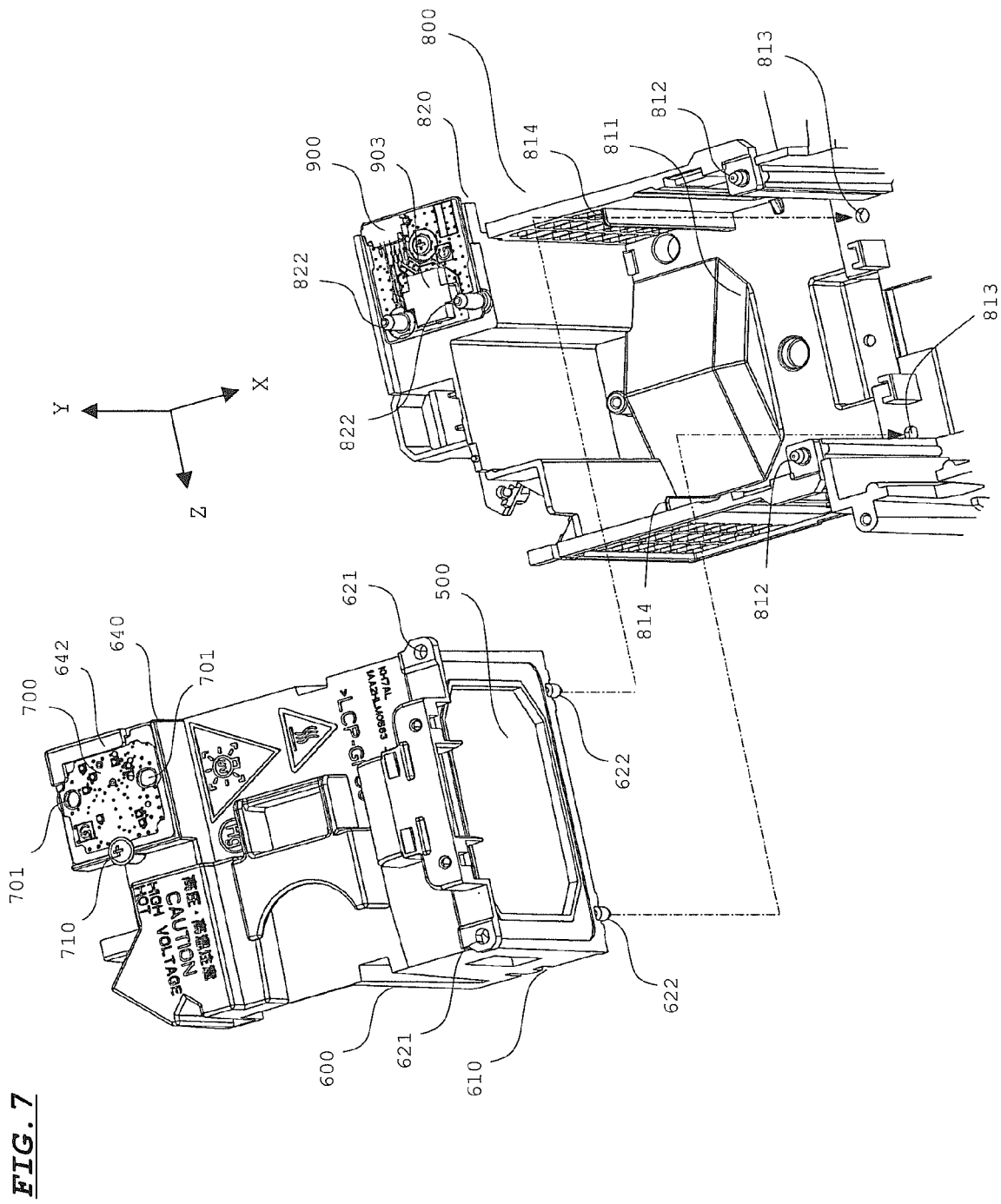
FIG. 7 is a perspective view for describing a method for attachment of the lamp unit in the embodiment.

Returning to FIG. 4, the holder housing 800 includes a box attachment part 811 that is open on front and upper sides. The box 610 of the lamp holder 600 is attached to the box attachment part 811. The box attachment part 811 has, on an upper front side, pins 812 respectively engaging with the two holes 621 of the lamp holder 600. The box attachment part 811 also has, on a front bottom side, holes 813 (not shown in FIG. 4. Refer to FIG. 7) respectively engaging with the two pins 622 of the lamp holder 600. The box attachment part 811 further has a pair of vertically extending guides 814 that lock the rear surface of the box 610 and guide the lamp holder 600 when the lamp holder 600 is attached. The box attachment part 811 has on two walls a ventilation opening 815 that allows winds to pass through the box attachment part 811.

The holder housing 800 has a board holding part 820 that is opposed to the board holding part 640 of the lamp holder 600 when the lamp holder 600 is attached.

Figure 5B:
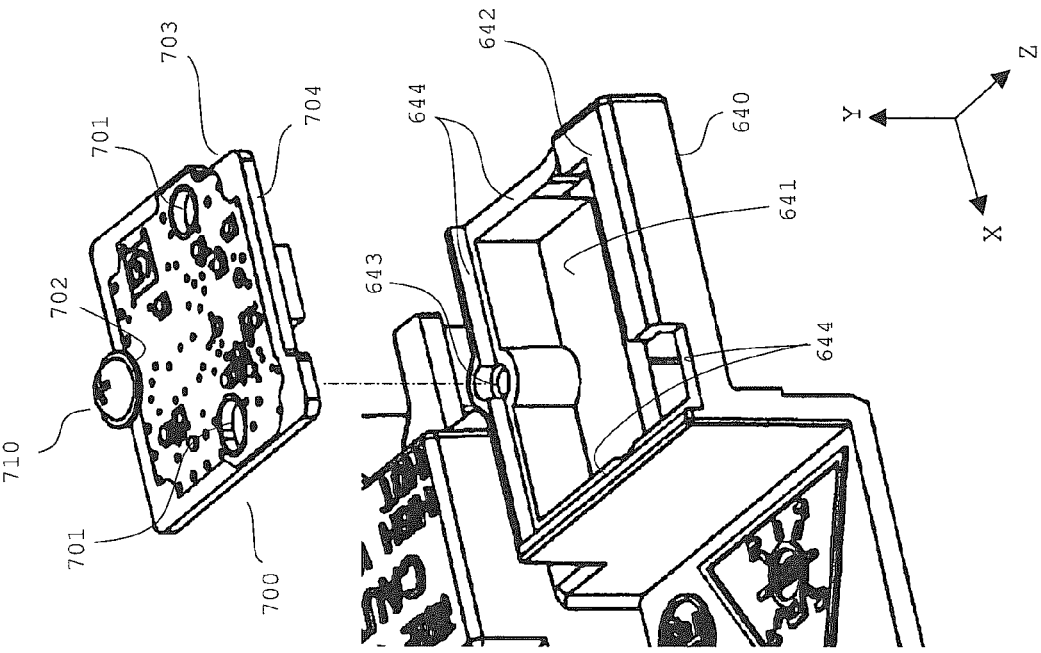

FIG. 5B is an enlarged view of the board holding part 820. The board holding part 820 has a concave 821, two pins 822 projecting from the concave 821, and a screw hole 823. The board holding part 820 also has a notch 824 near the screw hole 823 on a wall surrounding the concave 821.

The circuit board 900 has a notch 901 and a hole 902, which engage with the two pins 822 on the board holding part 820. The circuit board 900 also has on an upper surface a connector 903 that connects with the connector 706 on the circuit board 700 disposed in the lamp holder 600, and a connector 904 that connects the connector 903 electrically to the main board. The circuit board 900 can be attached to the board holding part 820 by screwing the screw 905 into the screw hole 823.

Returning to FIG. 4, for mounting the lamp unit, first the lamp 500 is attached to the box 610 of the lamp holder 600. Then, the circuit board 700 is attached to the board holding part 640 of the lamp holder 600. Referring to FIG. 5A, the circuit board 700 can be attached by placing the circuit board 700 on the placement part 644 while fitting the notches 703 and 704 into the L-shaped locking part 642, and then screwing the screw 710 into the screw hole 643. At the time, the screw 710 is screwed into the screw hole 643 in such a manner that a slight clearance is left between the screw head and the upper surface of the circuit board 700. Accordingly, the circuit board 700 can be attached to the board holding part 640 so as to be displaceable only by a predetermined stroke in the X- and Z-axis directions.

Returning to FIG. 4, the circuit board 900 is attached to the board holding part 820 in the main unit chassis. Referring to FIG. 5B, for attachment of the circuit board 900, the circuit board 900 is placed on the notch 824 and on seats 822a at a base of the two pins 822 while the notch 901 and the hole 902 are fitted to the two pins 822, respectively. An upper surface of the seat 822a and an upper surface of the notch 824 are at the same height. Subsequently, the screw 905 is screwed into the screw hole 823.

Here, the notch 901 and the hole 902 are engaged with the pins 822 with almost no play. Accordingly, when being placed on the notch 824 and the seats 822a at the base of the pins 822 as stated above, the circuit board 900 is positioned in the X- and Z-axis directions with respect to the board holding part 820. In addition, the screw 905 is screwed into the screw hole 823 until the screw 905 is pressurized and brought into contact with the upper surface of the circuit board 900. This allows the circuit board 900 to be incapable of being displaced also in the Y-axis direction and thus be positioned in the Y-axis direction.

FIG. 7 is a diagram of the lamp unit in which the two circuit boards 700 and 900 are attached to the board holding parts 640 and 820, respectively. Subsequently, the lamp holder 600 is mounted to the holder housing 800 by pushing the box 610 into the box attachment part 811 while bringing the rear surface of the box 610 into contact with the guides 814.

A distance from a front inner side of the box attachment part 811 to the guides 814 is made slightly larger than a length of the box 610 in the X-axis direction. Accordingly, the lamp holder 600 can be housed in the holder housing 800 in a predetermined position by pushing the box 610 into the box attachment part 811 while bringing the rear surface of the box 610 into contact with the guides 814.

When the lamp holder 600 is pushed into the box attachment part 811 as stated above, ends of the two pins 812 on the holder housing 800 side are inserted into the two holes 621 of the lamp holder 600 side, and ends of the two pins 622 on the lamp holder 600 side are inserted into the two holes 813 of the holder housing 800, before the lamp holder 600 reaches the predetermined position in the holder housing 800. At the same time, ends of the two pins 822 extending from the board holding part 820 are inserted into the two holes 701 of the circuit board 700.

Here, the pins 812 and 622 each have a tapered end, and therefore, when the lamp holder 600 is further pushed into the box attachment part 811, the lamp holder 600 is guided by the inclined ends of the pins 812 and 622 and then is placed into the predetermined position. Accordingly, the light axis of the lamp 500 attached to the lamp holder 600 is properly set with respect to a subsequent optical system.

In addition, the pins 822 have inclines 822b at tapered ends (refer to FIG. 5B). Therefore, when the lamp holder 600 is further pushed into the box attachment part 811 with the pins 822 inserted into the holes 701, the circuit board 700 is guided and displaced in the X- and Z-axis directions by the inclines 822b at the pin 822 ends. Accordingly, the connector 706 on the circuit board 700 is properly opposed to the connector 903 on the circuit board 900, and then the lamp holder 600 is further pushed to connect the connectors 706 and 903.

FIG. 8A is a diagram of the lamp unit in which the lamp holder 600 is pushed completely into the box attachment part 811. FIG. 8B is a perspective view of the vicinities of the board holding 640 and 820. FIG. 8C is a perspective view similar to that in FIG. 8B except that the board 700 removed.

As shown in FIGS. 8A to 8C, when the lamp holder 600 is pushed completely into the box attachment part 811, the lamp 500 is properly positioned, and the connector 706 on the circuit board 700 and the connector 903 on the circuit board 900 are connected to each other.

Figure 9:
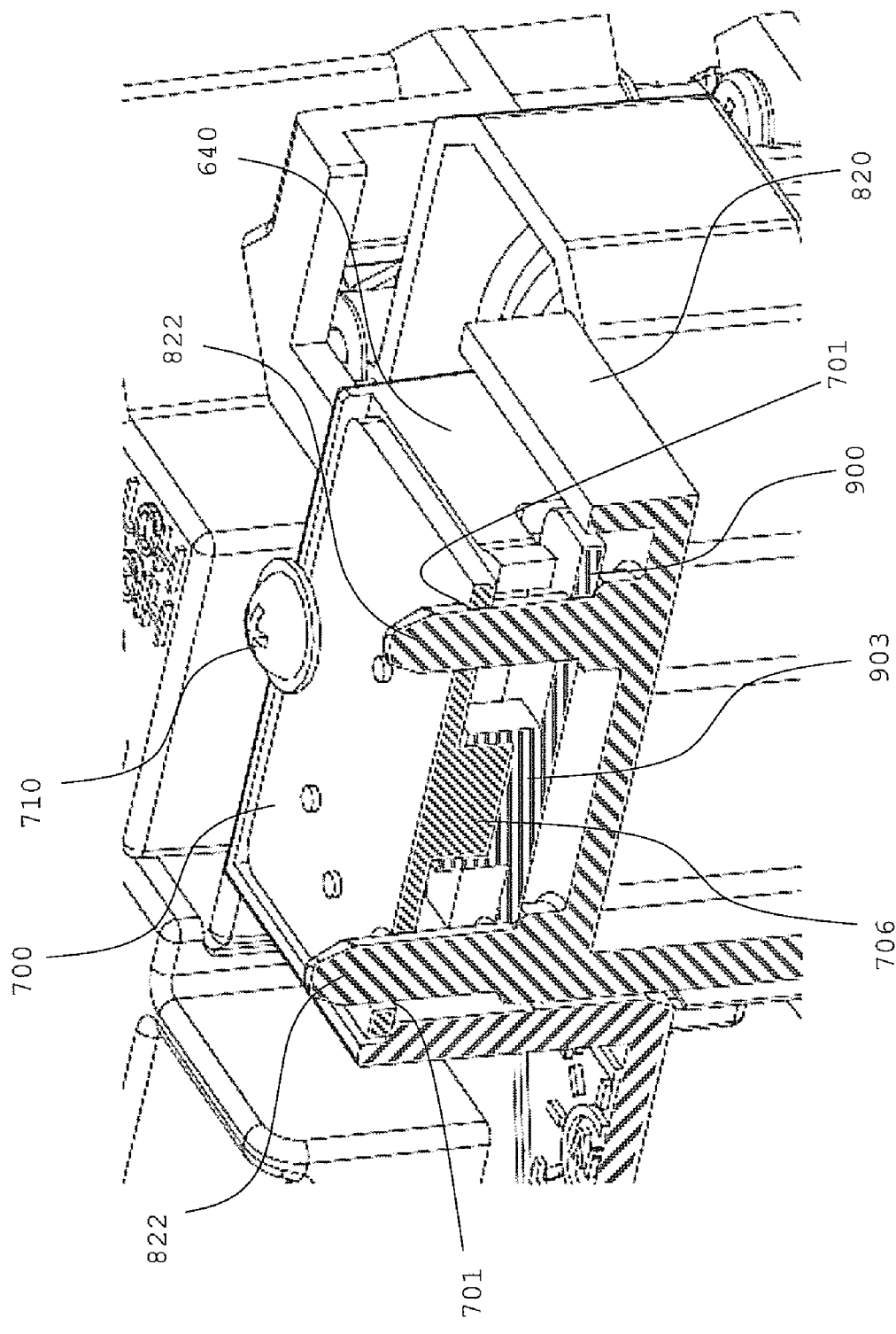
FIG. 9 is a partial cross section view of the attached lamp unit in the embodiment.

FIG. 9 is a cross section view of the diagram in FIG. 8B along a line A-A'. Length of the pins 822 is designed such that portions of the pins 822 further at the base than the ends thereof are fitted into the holes 701 of the circuit board 700, before the connector 903 on the circuit board 900 are connected to the connector 706 on the circuit board 700. Accordingly, when starting to connect with each other, the connectors 706 and 903 are completely positioned, thereby allowing smooth connection between the connectors 706 and 903.

According to this embodiment as described above, even if the connectors 706 and 903 are not opposed to each other when the lamp holder 600 is attached to the holder housing 800, the circuit board 700 can be guided by the pins 822 and displaced by the holes 701, allowing the connectors 706 and 903 to be positively opposed to each other. Therefore, it is possible to easily connect the connectors 706 and 903 when the lamp holder 600 is attached to the holder housing 800.

By tapering the pins 822 at ends as in this embodiment, the ends of the pins 822 can be easily inserted into the holes 701 when the lamp holder 600 is attached to the holder housing 800. In addition, since the circuit board 700 is properly positioned by pins 822 as stated above according to this embodiment, the connectors 706 and 903 can be connected to each other only by attaching the lamp holder 600 to the holder housing 800.

Although the preferred embodiment of the present invention has been described above, the present invention is not limited by the foregoing embodiments. In addition, the foregoing embodiment of the present invention can be modified in various manners.

For example, although the circuit board 700 is displaceable in the X- and Z-axis directions in the foregoing embodiment, the circuit board 700 may be fixed and instead the circuit board 900 may be displaceable in the X- and Y-axis directions in a state of being attached to the board holding part 820. In this arrangement, the pins for positioning the circuit board 900 will be disposed on the board holding part 640 side.

In addition, although the circuit board 900 is displaced by the pins 822 in the foregoing embodiment, the pins 822 may be omitted and instead the circuit board 700 may be manually moved for correction of a positional shift to thereby oppose the connector 706 to the connector 903. However, this arrangement requires positional adjustment of the circuit board 700 and thus lowers workability significantly as compared with the foregoing embodiment.

Further, the circuit board 900 is provided on the holder housing 800 as a relay to the main board in the foregoing embodiment. Alternatively, if the main board can be disposed in the vicinity of the holder housing 800 in a position corresponding to the board holding part 640 of the lamp holder 600, the main board may have a connector that connects with the connector 706 on the lamp holder 600.

Besides, although the foregoing embodiment employs an illuminating device having two lamp units and a projector for instance, the number of mounted lamp units may be one, or three or more. In addition, the lamp unit and the illuminating device according to the present invention are applicable to products other than projectors.

The embodiments of the present invention can be appropriately modified in various manners within the scope of the technical idea specified in the claims.

What is claimed is:

1. An illuminating device, comprising:
a lamp holder for holding a lamp;
a first circuit board being attached to the lamp holder and having a first connector;
a holder housing the lamp holder attached thereto; and
a second circuit board being arranged on the holder housing side and having a second connector connected to the first connector, wherein
the lamp holder is attached to the holder housing by being moved in a direction of connection between the first connector and the second connector, and
either one of the first circuit board and the second circuit board is displaceable in a direction perpendicular to the direction of connection between the first connector and the second connector.

2. The illuminating device according to claim 1, comprising:
a position adjustment mechanism for adjusting the relative positions of the first connector and the second connector so that the first connector and the second connector can be opposed and connected to each other when the lamp holder is attached to the holder housing.

3. The illuminating device according to claim 2, wherein the position adjustment mechanism comprises a hole in a displaceable circuit board of the first circuit board and the second circuit board, and a projection projecting from the other circuit board and engaging with the hole.

4. The illuminating device according to claim 3, wherein the projection has a tapered end.

5. An image display device, comprising:
an illuminating device;
an imager for modulating illumination light generated by the illuminating device in accordance with an image signal; and
a light-guiding optical system for guiding the illumination light from the illuminating device to the imager, wherein the illuminating device comprises:
a lamp holder for holding a lamp;
a first circuit board being attached to the lamp holder and having a first connector;
a holder housing the lamp holder attached thereto; and
a second circuit board being arranged on the holder housing side and having a second connector connected to the first connector, wherein
the lamp holder is attached to the holder housing by being moved in a direction of connection between the first connector and the second connector, and
either one of the first circuit board and the second circuit board is displaceable in a direction perpendicular to the direction of connection between the first connector and the second connector.

6. The image display device according to claim 5, wherein the illuminating device has a position adjustment mechanism that adjusts the relative positions of the first connector and the second connector so that the first connector and the second connector can be opposed and connected to each other when the lamp holder is attached to the holder housing.

7. The image display device according to claim 6, wherein the position adjustment mechanism comprises a hole in a displaceable circuit board of the first circuit board and the second circuit board, and a projection projecting from the other circuit board and engaging with the hole.

8. The image display device according to claim 7, wherein the projection has a tapered end.

9. A lamp unit, comprising:
a lamp;
a lamp holder holding the lamp; and
a circuit board being attached to the lamp holder and having a connector, wherein
the circuit board is displaceable in a direction perpendicular to a direction of connection of the connector.

10. The lamp unit according to claim 9, wherein
the circuit board is provided with a hole that engages with a projection projecting from a holder housing when the lamp holder is attached to the holder housing of a main unit.

* * * * *